(12) United States Patent
Reime

(10) Patent No.: US 8,276,313 B2
(45) Date of Patent: Oct. 2, 2012

(54) METHOD AND APPARATUS FOR TRAPPING INSECTS

(76) Inventor: Gerd Reime, Bühl (DE)

( * ) Notice: Subject to any disclaimer, the term of this patent is extended or adjusted under 35 U.S.C. 154(b) by 251 days.

(21) Appl. No.: 12/620,024

(22) Filed: Nov. 17, 2009

(65) Prior Publication Data

US 2010/0058645 A1    Mar. 11, 2010

Related U.S. Application Data

(63) Continuation-in-part of application No. 10/571,679, filed as application No. PCT/EP2004/010342 on Sep. 15, 2004, now abandoned.

(30) Foreign Application Priority Data

Sep. 17, 2003 (DE) .................................. 103 42 939

(51) Int. Cl.
*A01M 1/04* (2006.01)
*A01M 3/00* (2006.01)
*A01M 1/08* (2006.01)

(52) U.S. Cl. ................ 43/113; 43/134; 43/135; 43/139

(58) Field of Classification Search .................... 43/113, 43/133–135, 139
See application file for complete search history.

(56) References Cited

U.S. PATENT DOCUMENTS

| | | | | |
|---|---|---|---|---|
| 454,720 A | * | 6/1891 | Dexter | 43/139 |
| 959,155 A | * | 5/1910 | Nault | 43/139 |
| 1,141,039 A | * | 5/1915 | Cox | 43/139 |
| 1,308,497 A | * | 7/1919 | Jolly | 43/139 |
| 1,478,424 A | * | 12/1923 | Cross | 43/139 |
| 1,497,540 A | * | 6/1924 | Bowen | 43/139 |
| 1,797,557 A | * | 3/1931 | Stine et al. | 43/139 |
| 1,807,550 A | * | 5/1931 | Rector | 43/139 |
| 2,992,770 A | * | 7/1961 | Keiser | 43/139 |
| 3,214,861 A | * | 11/1965 | Arther | 43/139 |
| 3,231,997 A | * | 2/1966 | Shugarman | 43/139 |
| 3,494,067 A | * | 2/1970 | Potrzuski | 43/134 |
| 3,965,608 A | * | 6/1976 | Schuman | 43/139 |
| 4,175,352 A | * | 11/1979 | Catlett | 43/139 |
| 4,630,329 A | * | 12/1986 | Shores | 43/139 |
| 4,631,858 A | * | 12/1986 | Kahle | 43/139 |
| 4,733,495 A | * | 3/1988 | Winnicki | 43/139 |
| 4,817,330 A | * | 4/1989 | Fahringer | 43/139 |
| 4,894,942 A | * | 1/1990 | Winkler | 43/4 |
| 5,040,326 A | * | 8/1991 | Van Dijnsen et al. | 43/139 |
| 5,052,147 A | * | 10/1991 | Broomfield et al. | 43/139 |
| 5,175,960 A | * | 1/1993 | Wade et al. | 43/139 |
| 5,222,322 A | * | 6/1993 | Mastromonaco | 43/139 |
| 5,305,495 A | * | 4/1994 | Nelsen et al. | 43/139 |
| 5,323,556 A | * | 6/1994 | Carle | 43/139 |

(Continued)

FOREIGN PATENT DOCUMENTS

BE       1000682 A   *   3/1989

(Continued)

*Primary Examiner* — Darren W Ark
(74) *Attorney, Agent, or Firm* — Rabin & Berdo, P.C.

(57) ABSTRACT

An apparatus for catching an insect sitting on a contact surface. The apparatus includes a casing, a light source disposed in the casing for dazzling and immobilizing the insect on the contact surface, and a catch tube disposed in the casing and movable relative to the casing. The apparatus further includes a catch container disposed adjacent to the catch tube and a slider to lift the insect off the contact surface. The slider is movable relative to the casing.

15 Claims, 18 Drawing Sheets

U.S. PATENT DOCUMENTS

Figure 7:
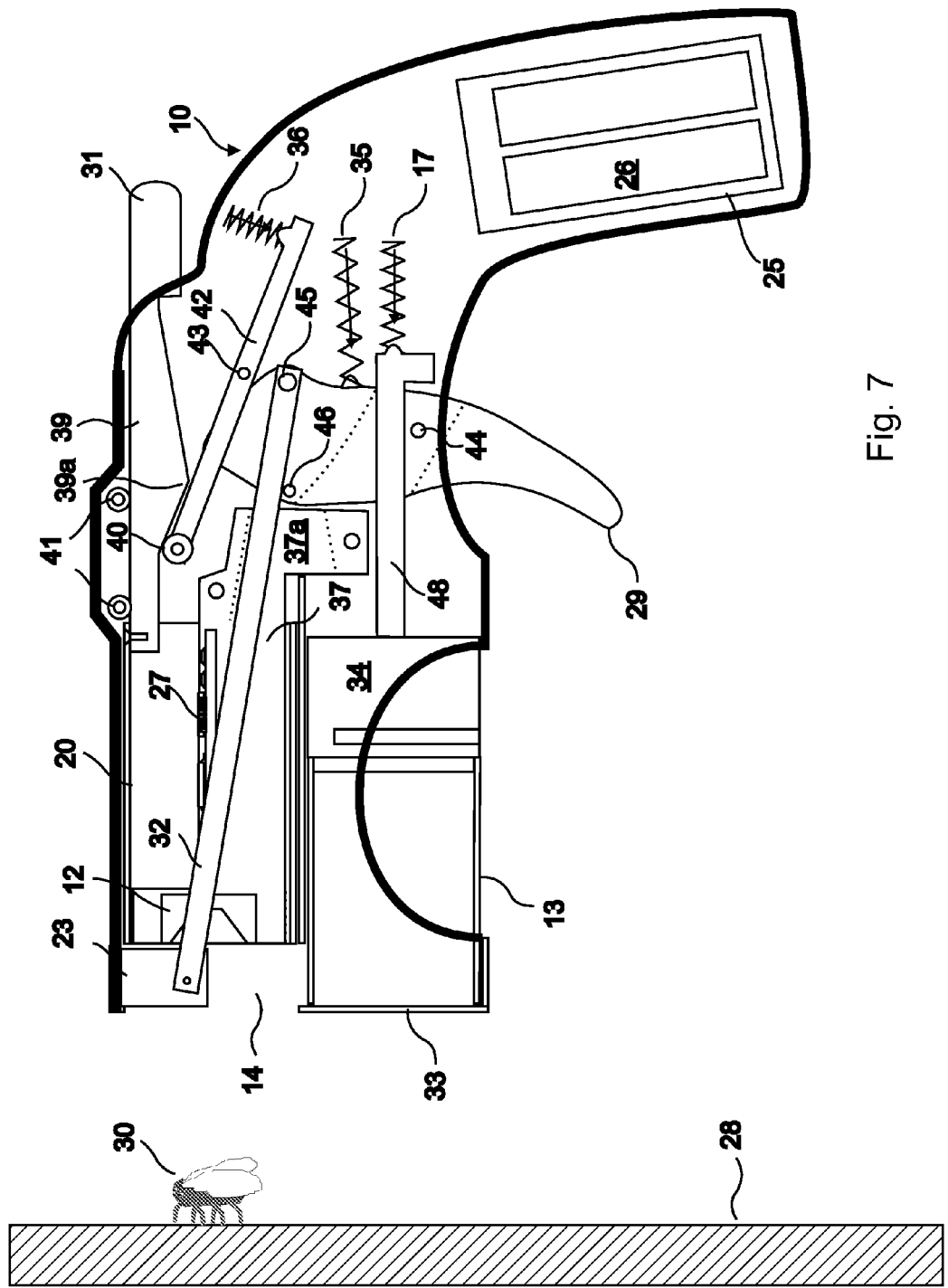

| | | | |
|---|---|---|---|
| 5,343,652 A * | 9/1994 | Johnson | 43/132.1 |
| 5,367,821 A * | 11/1994 | Ott | 43/139 |
| 5,402,598 A * | 4/1995 | Wade et al. | 43/139 |
| 5,417,009 A * | 5/1995 | Butler et al. | 43/113 |
| 5,522,173 A * | 6/1996 | Muhlinghaus | 43/134 |
| 5,857,282 A * | 1/1999 | Odintsov | 43/113 |
| 6,143,313 A * | 11/2000 | Ito et al. | 424/409 |
| 6,199,315 B1 * | 3/2001 | Suzue et al. | 43/113 |
| 6,391,329 B1 * | 5/2002 | Ito et al. | 424/409 |
| 6,393,759 B1 * | 5/2002 | Brown et al. | 43/113 |
| 6,397,515 B1 * | 6/2002 | Brown et al. | 43/113 |
| 6,467,215 B1 * | 10/2002 | Nelson et al. | 43/139 |
| 6,568,123 B2 * | 5/2003 | Nelson et al. | 43/139 |
| 6,568,125 B2 * | 5/2003 | Kleinhenz | 43/139 |
| 6,625,918 B2 * | 9/2003 | Bhullar | 43/1 |
| 6,651,380 B2 * | 11/2003 | Wyers | 43/139 |
| 6,718,681 B2 * | 4/2004 | Bhullar | 43/1 |
| 2005/0246945 A1 * | 11/2005 | Evink | 43/139 |
| 2006/0179708 A1 * | 8/2006 | Garland | 43/139 |
| 2006/0218851 A1 * | 10/2006 | Weiss et al. | 43/139 |
| 2006/0260183 A1 * | 11/2006 | Hockaday | 43/129 |
| 2007/0056207 A1 * | 3/2007 | Chen | 43/113 |

FOREIGN PATENT DOCUMENTS

| | | | |
|---|---|---|---|
| BE | 1000682 A7 | | 3/1989 |
| DE | 3511215 A1 | | 10/1986 |
| DE | 3511215 C2 | * | 10/1986 |
| DE | 4112266 C1 | * | 5/1992 |
| DE | 4327150 A1 | * | 2/1995 |
| DE | 4327150 A1 | | 2/1995 |
| DE | 69029727 | | 1/1997 |
| DE | 69029727 T2 | * | 1/1997 |
| DE | 29806669 | | 9/1998 |
| DE | 29806669 U1 | * | 9/1998 |
| DE | 69512266 | | 9/1999 |
| DE | 69512266 T2 | * | 9/1999 |
| DE | 19835059 A1 | | 2/2000 |
| DE | 19835059 A1 | * | 2/2000 |
| GB | 424235 | * | 2/1935 |
| GB | 424235 A | | 2/1935 |
| GB | 2351645 A | * | 1/2001 |
| GB | 2351645 A | | 1/2001 |
| GB | 2450997 A | * | 1/2009 |
| GB | 2465177 A | * | 5/2010 |
| JP | 05161443 A | * | 6/1993 |
| JP | 05161443 A | | 6/1993 |
| JP | 11103747 A | * | 4/1999 |
| JP | 11103747 A | | 4/1999 |
| JP | 2002186398 A | | 7/2002 |
| JP | 2002186398 A | * | 7/2002 |
| JP | 2006149357 A | * | 6/2006 |
| JP | 2006158337 A | | 6/2006 |
| JP | 2006158337 A | * | 6/2006 |
| JP | 2007209265 A | * | 8/2007 |
| JP | 2007209265 A | | 8/2007 |
| WO | WO 93/25073 A1 | * | 12/1993 |
| WO | WO-93/25073 A1 | | 12/1993 |
| WO | WO-9608170 A1 | | 3/1996 |
| WO | WO 9608170 A1 | * | 3/1996 |
| WO | WO-2007140636 A1 | | 12/2007 |
| WO | WO 2007140636 A1 | * | 12/2007 |

* cited by examiner

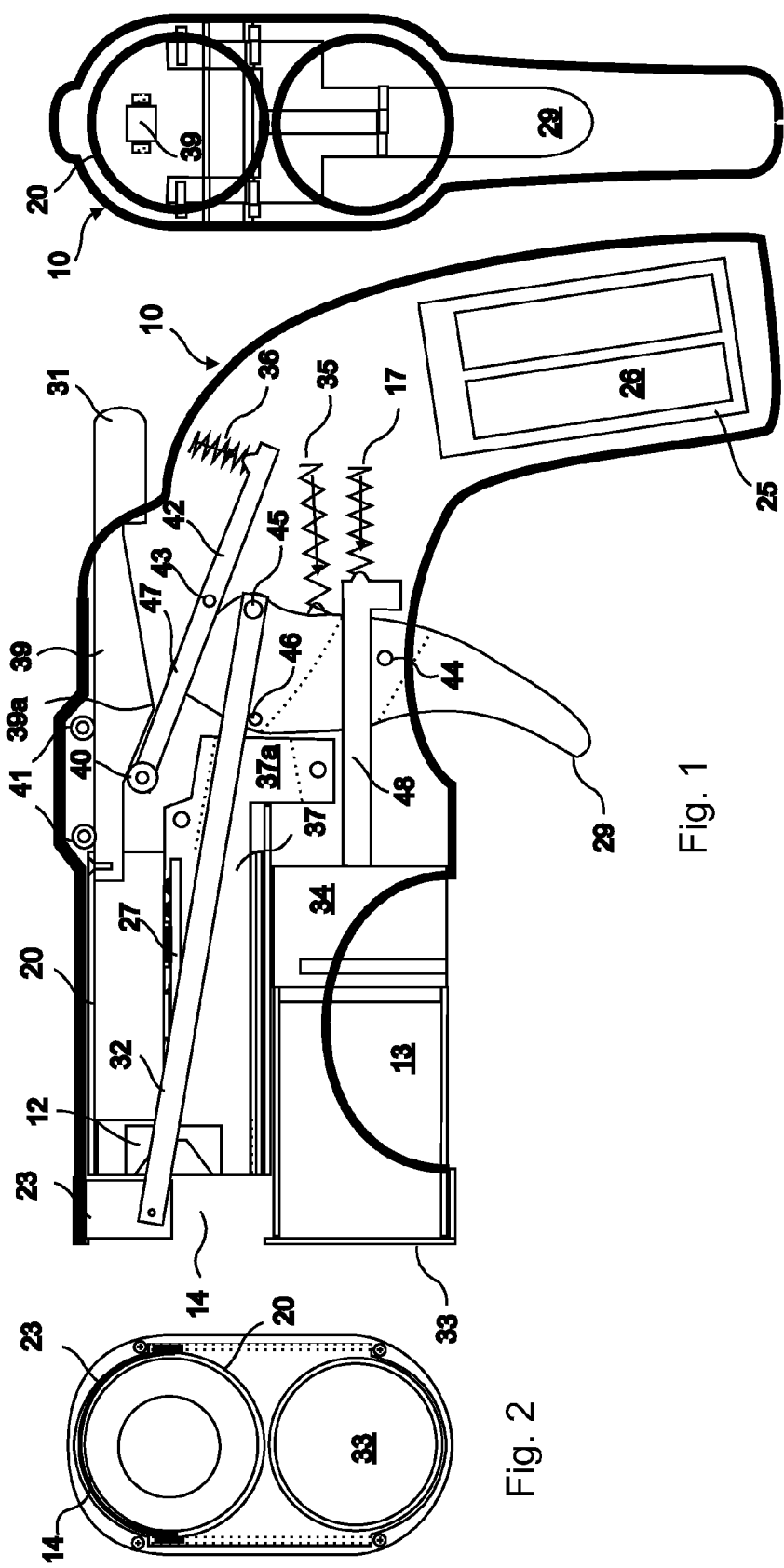

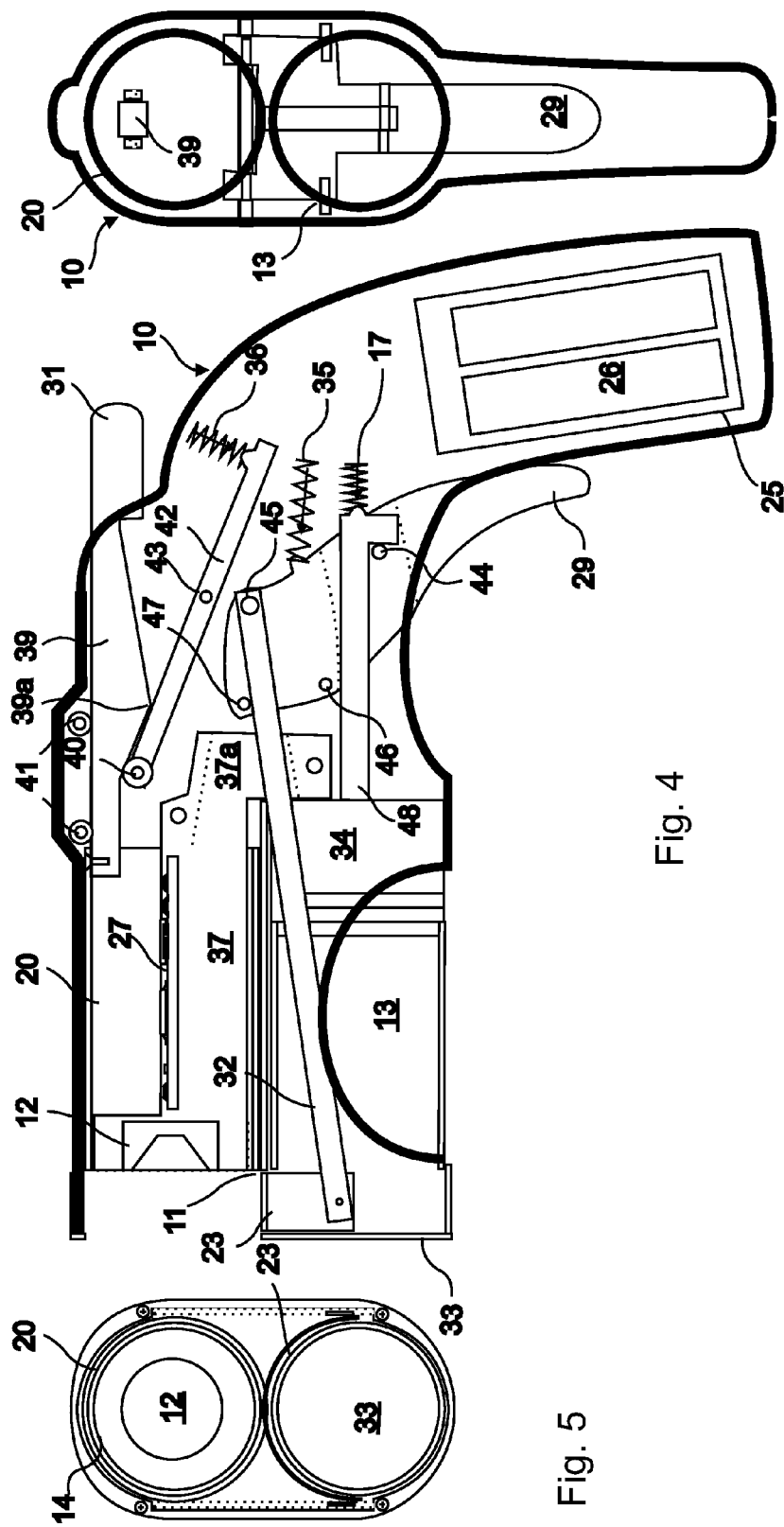

METHOD AND APPARATUS FOR TRAPPING INSECTS

REFERENCE TO RELATED APPLICATIONS

The present application claims the priority of German patent application 103 42 939.5, filed on Sep. 17, 2003, the disclosure content of which is hereby expressly made the object of the present application. Furthermore, the present application is a continuation in part application of U.S. patent application Ser. No. 10/571,679, the disclosure content of which is also hereby expressly made the object of the present application.

FIELD OF THE INVENTION

The invention relates to an apparatus for catching an insect sitting on a contact surface. The apparatus comprising a casing; a light source disposed in the casing for dazzling and immobilising the insect on the contact surface; a catch tube disposed in the casing and movable relative to the casing; a catch container disposed adjacent to the catch tube; and a slider to lift the insect off the contact surface, the slider being movable relative to the casing. Particularly irksome insects, such as common house flies, mosquitoes and more especially midges can be trapped with such an apparatus.

PRIOR ART

Numerous methods and apparatuses to catch insects, more especially flying insects, have already been proposed. Paper strips that can be hung from the ceiling and are provided with an adhesive are known in the domestic sector. If an insect comes too close to the adhesive, it remains stuck to it. On the other hand, devices are known where insects can be lured more especially by means of UV light, subsequently being killed on a grid that is supplied with electric current.

U.S. Pat. No. 6,568,125 discloses a suction-type apparatus within a collection area where a vacuum can be generated and insects can be attracted by a light bulb.

U.S. Pat. No. 4,733,459 discloses an apparatus provided with a vacuum or suction mechanism that jumps out to collect an insect. However, the catch tube is entirely disposed within the housing and cannot contact the contact surface.

U.S. Pat. No. 3,965,608 makes known a hand-held device of the suctioning type, which vacuums in the insect, however, it is not able to lift the insect from a contact surface.

DE 43 27 150 A1 makes known an apparatus in the form of a hand-held device, where an insect is pulled into a collecting area by means of a partial vacuum, which is generated where necessary. The insects are immobilised or respectively killed by is the partial vacuum and can then be disposed of from the collecting area.

WO-A 93/25073 makes known a laser device for keeping insects away. The laser is used to dazzle the insects until they have been destroyed in front of an opening to be protected, but does not trap the insects.

DE 695 12 266 T2 uses a light source to attract insects, in this case a surface is illuminated and said surface interacts with a surface that is supplied with electric current and on which the insect is killed on contact. The immobilising of the insects is effected on contact with the surface that is supplied with electric current. Similar trap apparatuses are known in DE 35 11 215 C2 and DE 198 35 059 A1.

DE 690 29 727 T2 makes known a comparable apparatus, where a UV light source is used to attract the insects, however, the grid connected behind is provided with a non-deadly electric charge. The insects can be stunned by this and moved into a collecting container. The immobilising by the electrically charged grid is effected behind the trap opening.

SUMMARY OF THE INVENTION

Proceeding from the state of the art, it is the object of the present invention to create an apparatus for trapping insects in a handy, simple manner.

This object is achieved by an apparatus for catching an insect sitting on a contact surface, the apparatus comprising a casing; a light source disposed in the casing for dazzling and immobilizing the insect on the contact surface; a catch tube disposed in the casing and movable relative to the casing; a catch container disposed adjacent to the catch tube; and a slider to lift the insect off the contact surface, the slider being movable relative to the casing.

The immobilising device is effective on a trap area or trap region in such a manner that the insect, which is preferably already no longer flying, before contacting the is apparatus is already immobilised in such a manner that it can be trapped. The insect is then passed into a catch container once the immobilising device has been switched off. The insects are gently collected up and can be removed from the catch container later where required. This is an important advantage, more especially for members of world religions who believe that the soul is reborn again in a different body. A slider lifts the insect off the contact surface wherein the slider is slidable relative to the casing and transports the insect into the catch container.

The immobilising of the insects is preferably effected by means of dazzling, a pulsing light at a frequency of between 5 and 20 Hertz being the most effective. The fact that pulsing light has this effect on insects seems not to be known in biology. This light is already effective in a trap region at some distance in front of the apparatus, such that the insects detected by the light no longer fly away. Due to the dazzle effect, the insects remain still such that they can be transferred into a trap area by the trap area being slipped over the said insects. The insects can then be moved into the collecting container and once the light source has been switched off and the dazzle effect has weakened, this usually occurs by the insects independently following their escape instinct and escaping into the collecting container.

Further advantages are produced from the sub claims.

SHORT DESCRIPTION OF THE FIGURES

The invention is described in more detail below by way of the enclosed Figures, in which:

FIG. 1 is a side sectional view of the apparatus in the form of a hand-held device in the initial state, FIG. 2 is a front view of the apparatus, FIG. 3 is a sectional view according to line 3-3 of FIG. 1.

Figure 8:
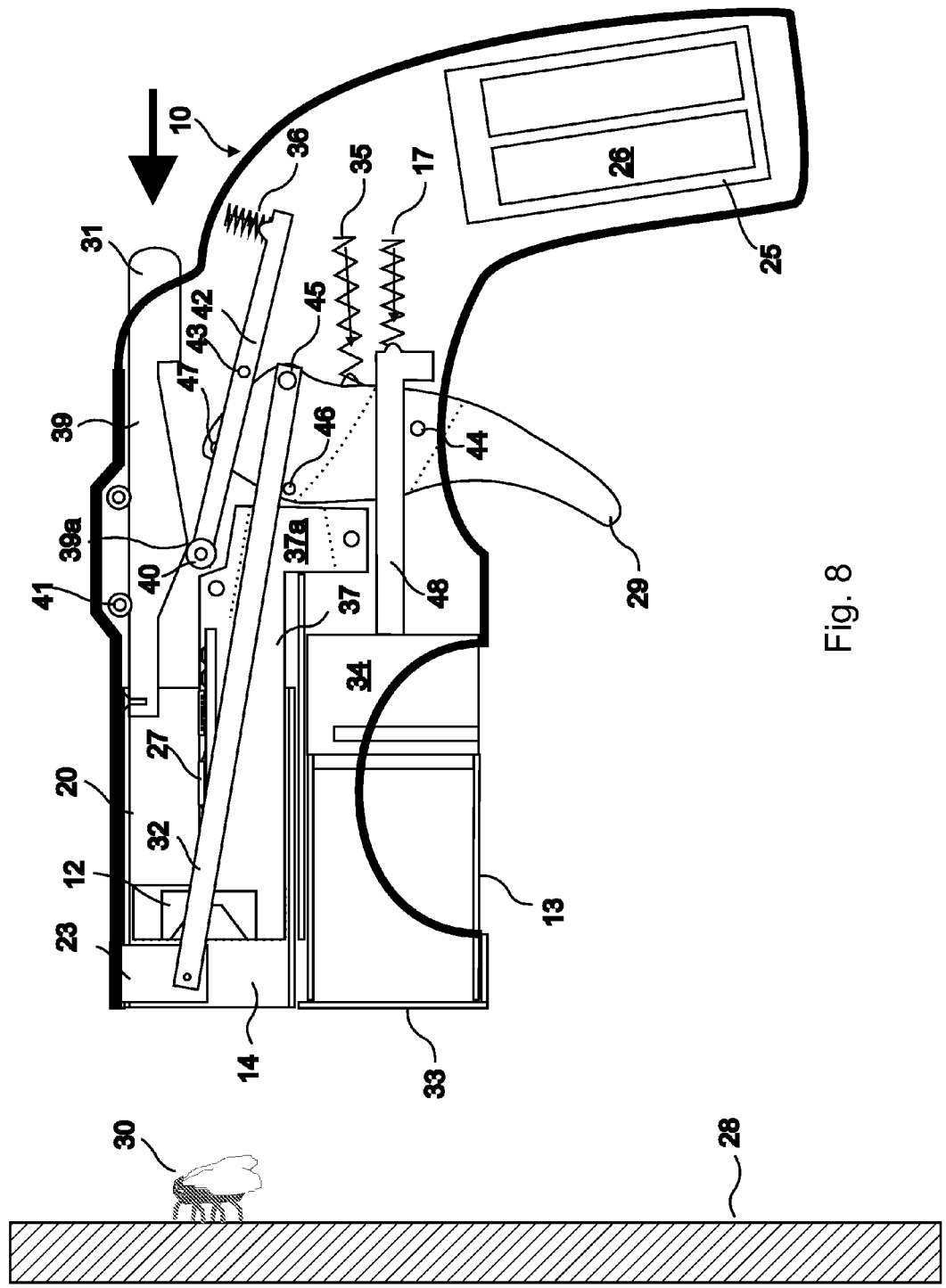
Figure 9:
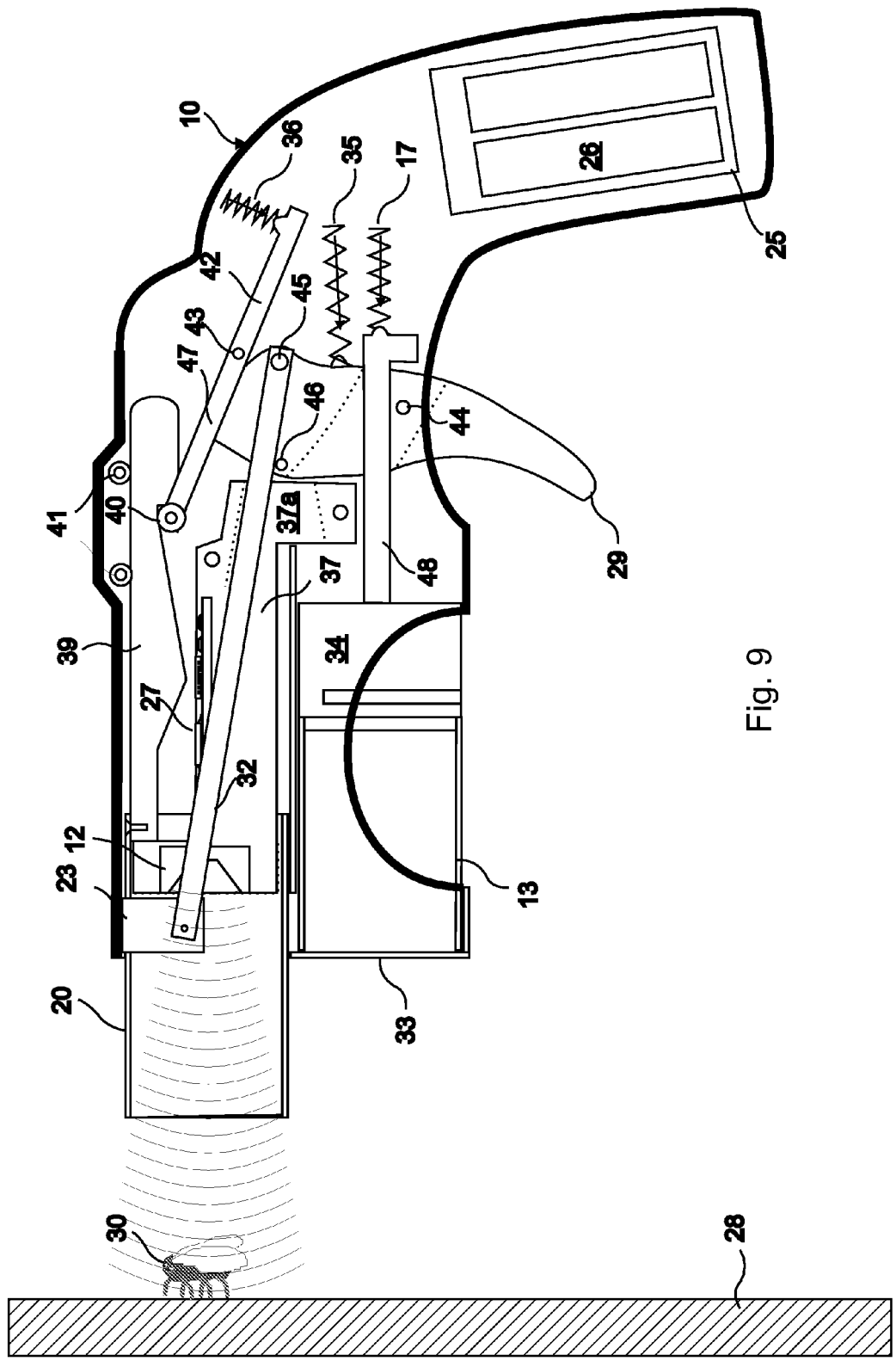
Figure 10:
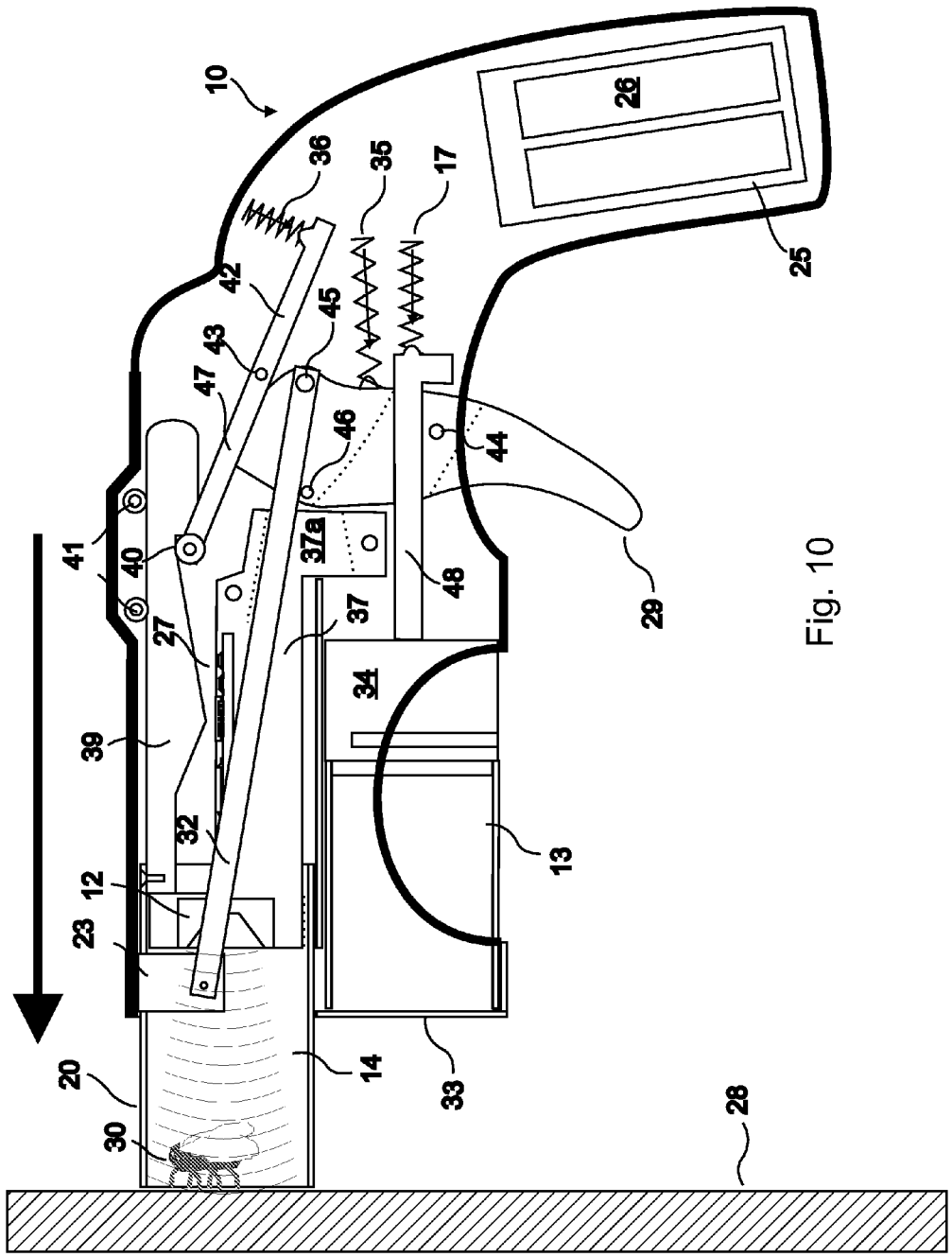
Figure 11:
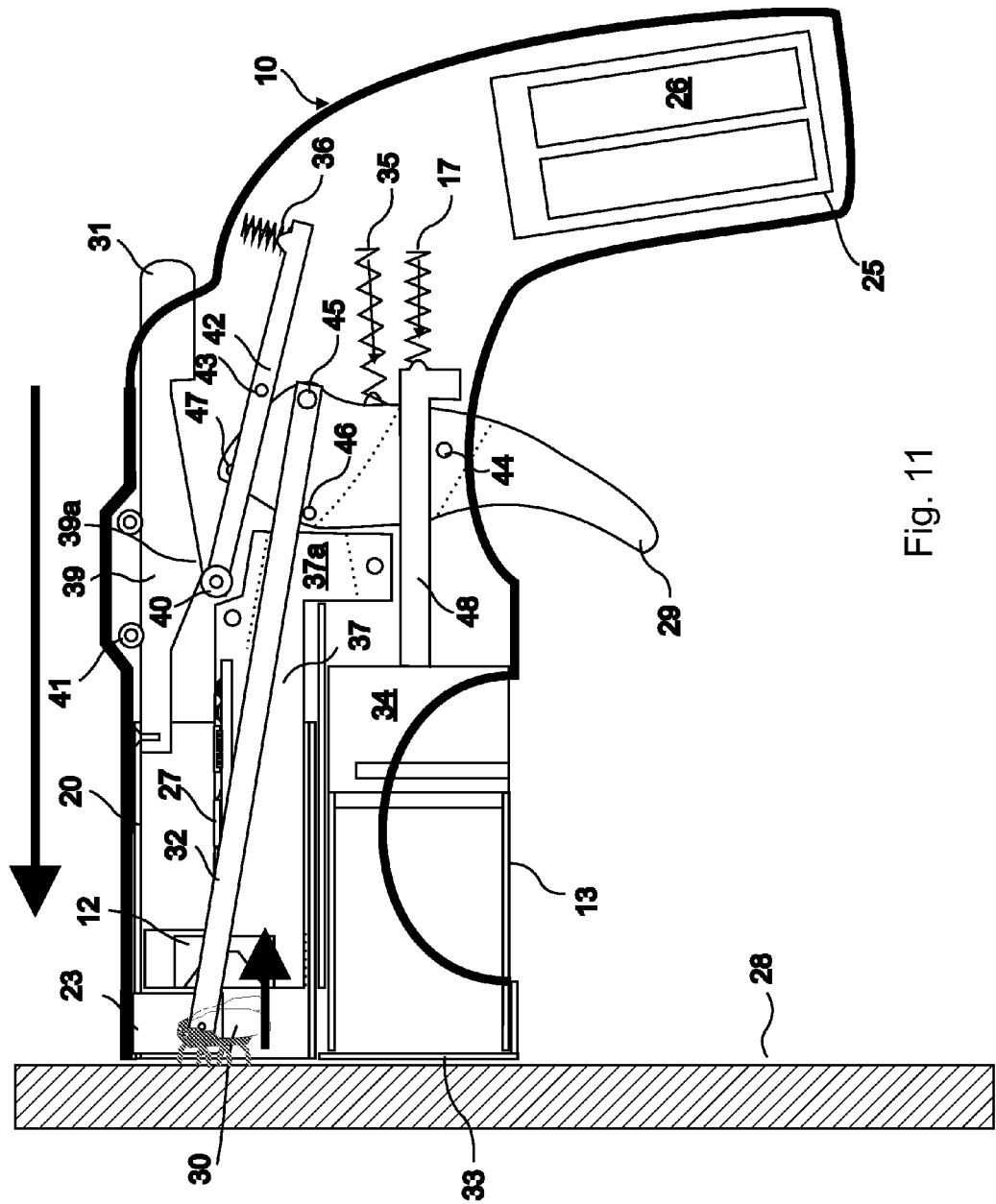
Figure 12:
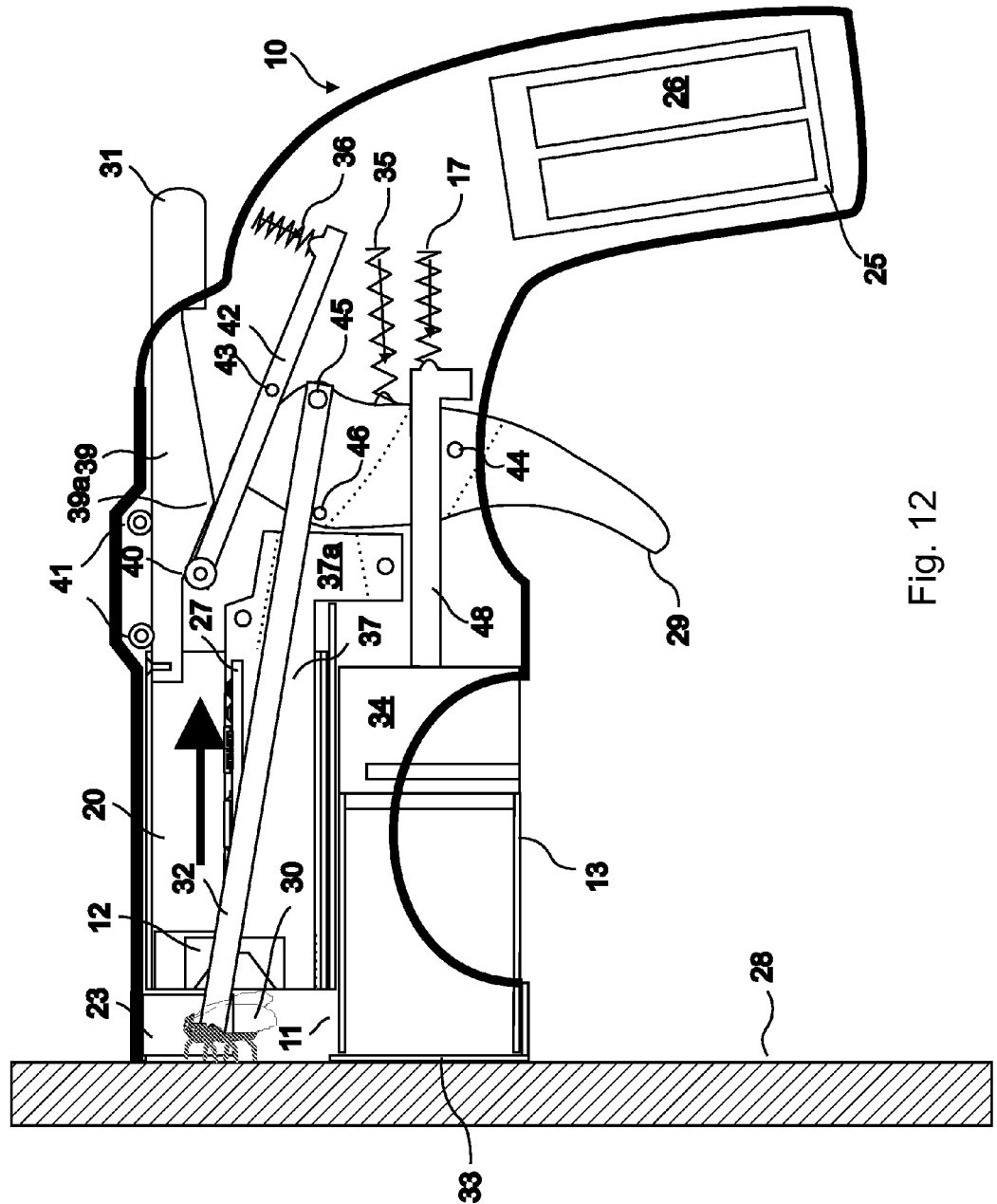
Figure 13:
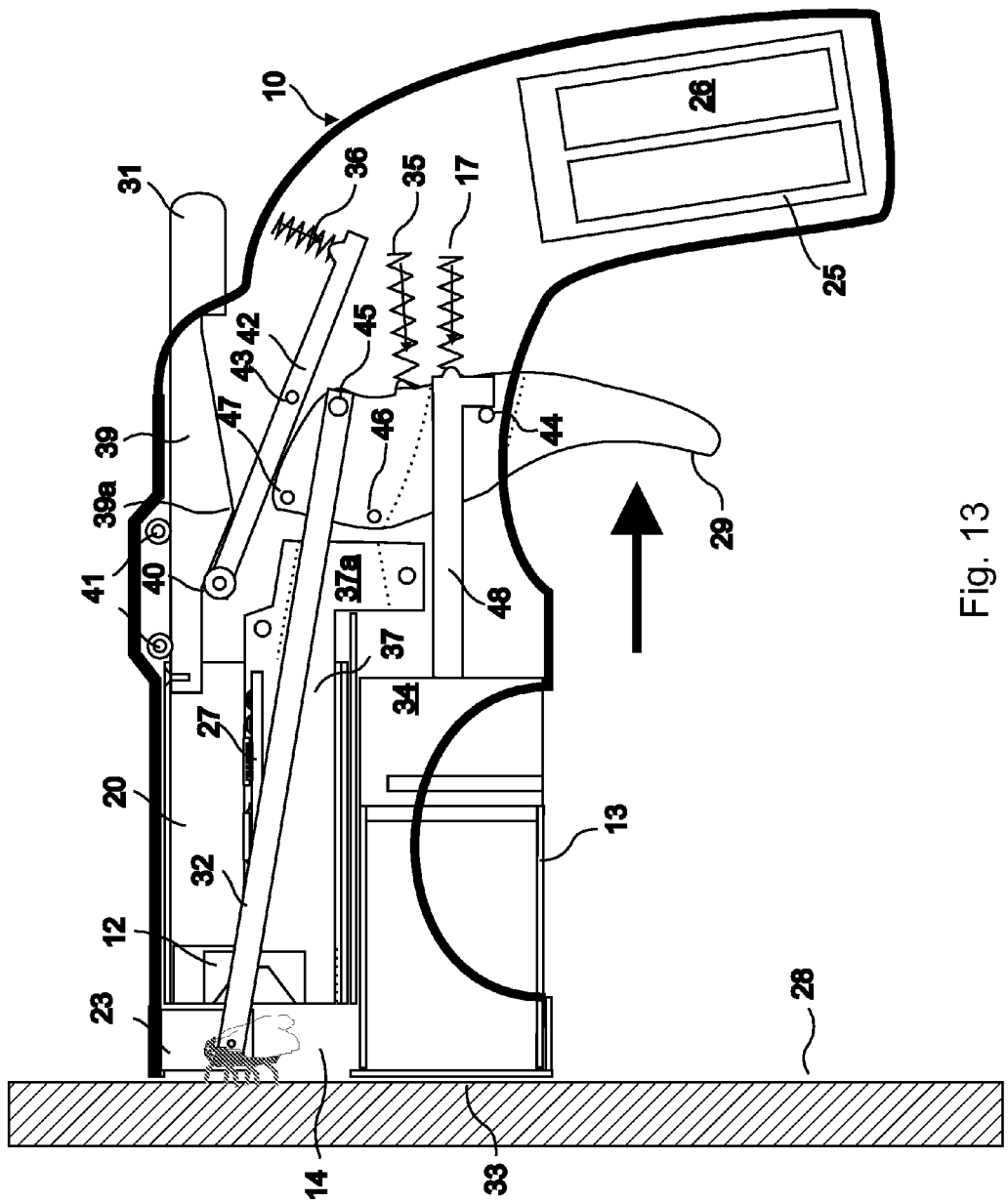
Figure 14:
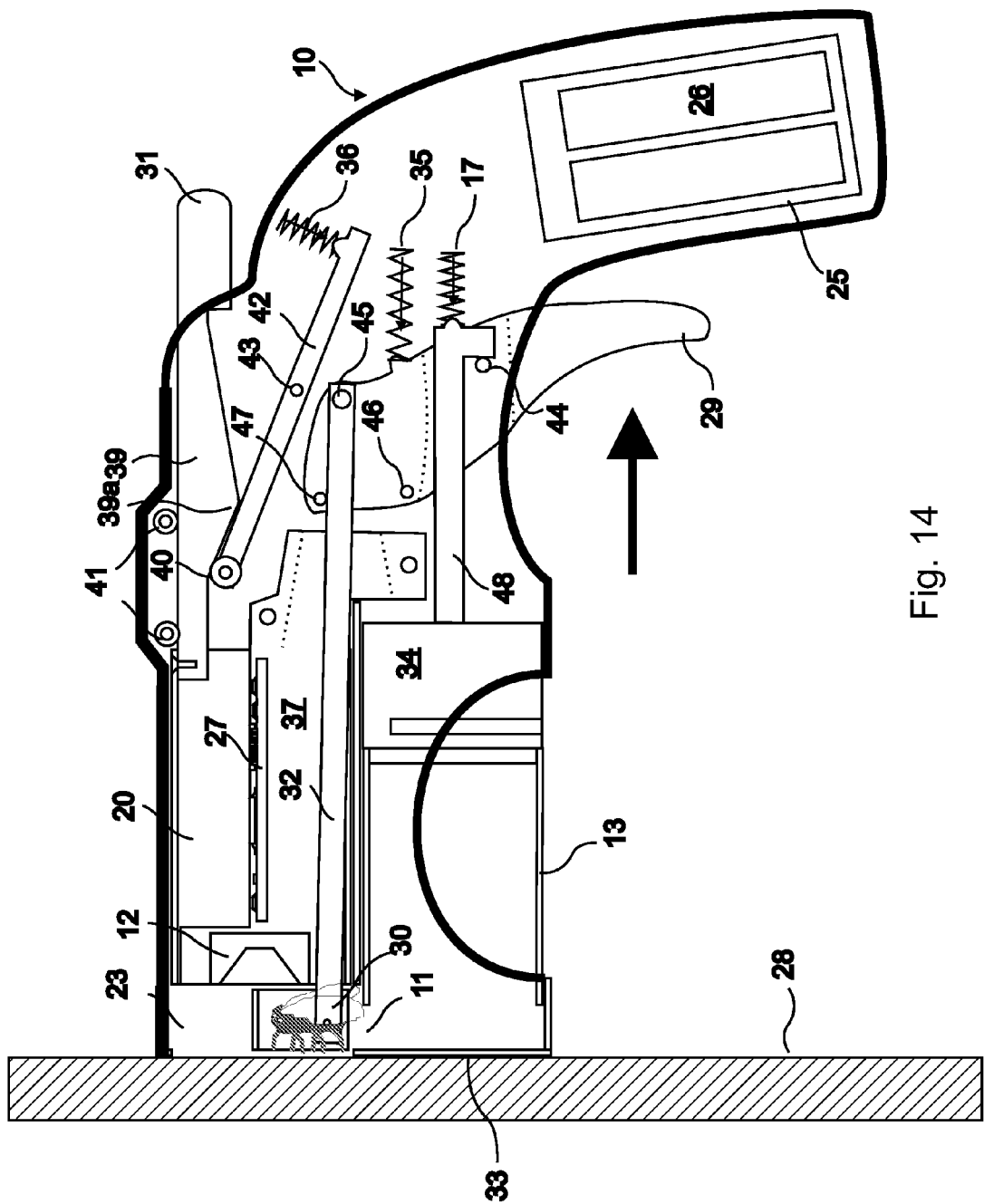
Figure 15:
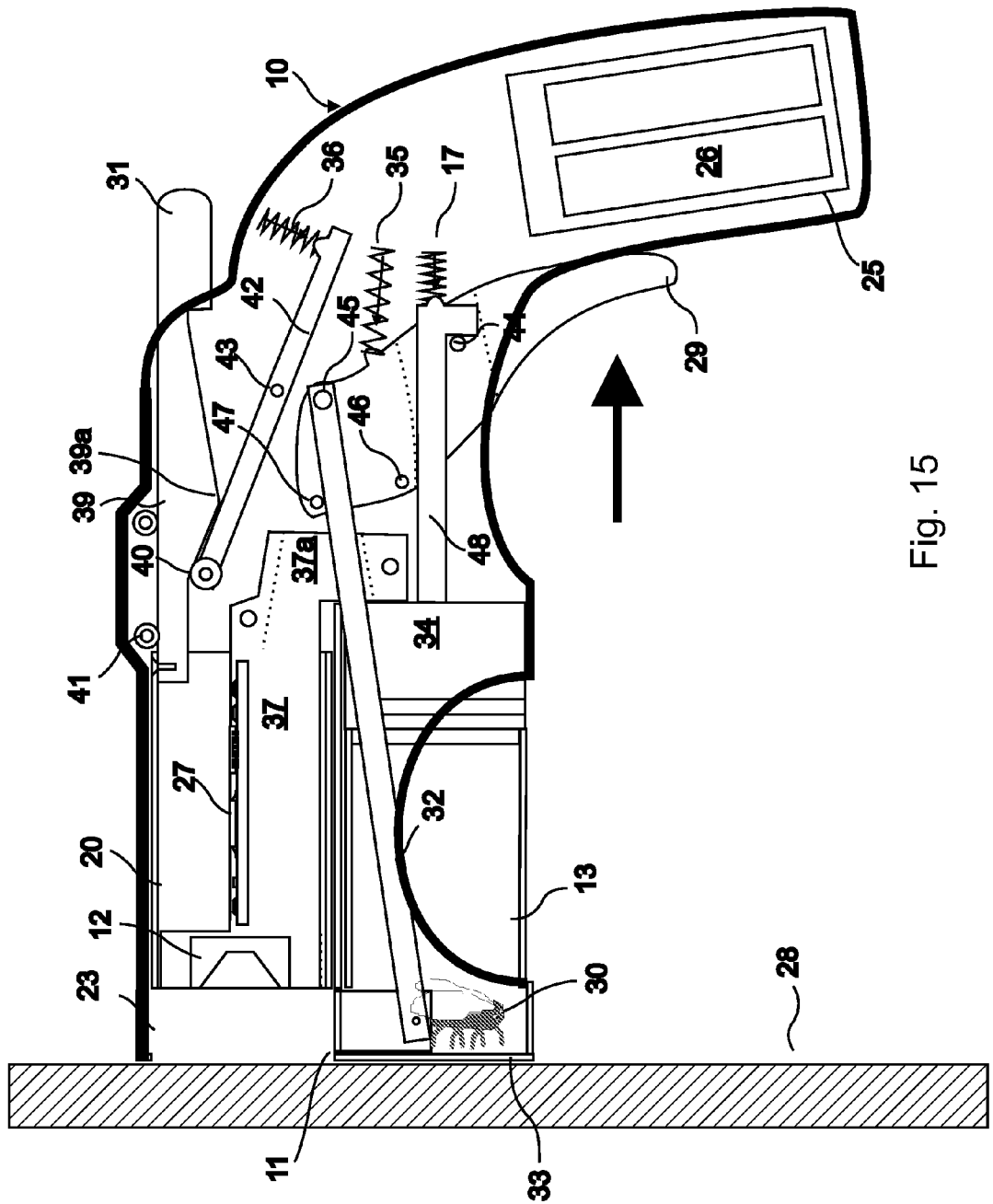
Figure 16:
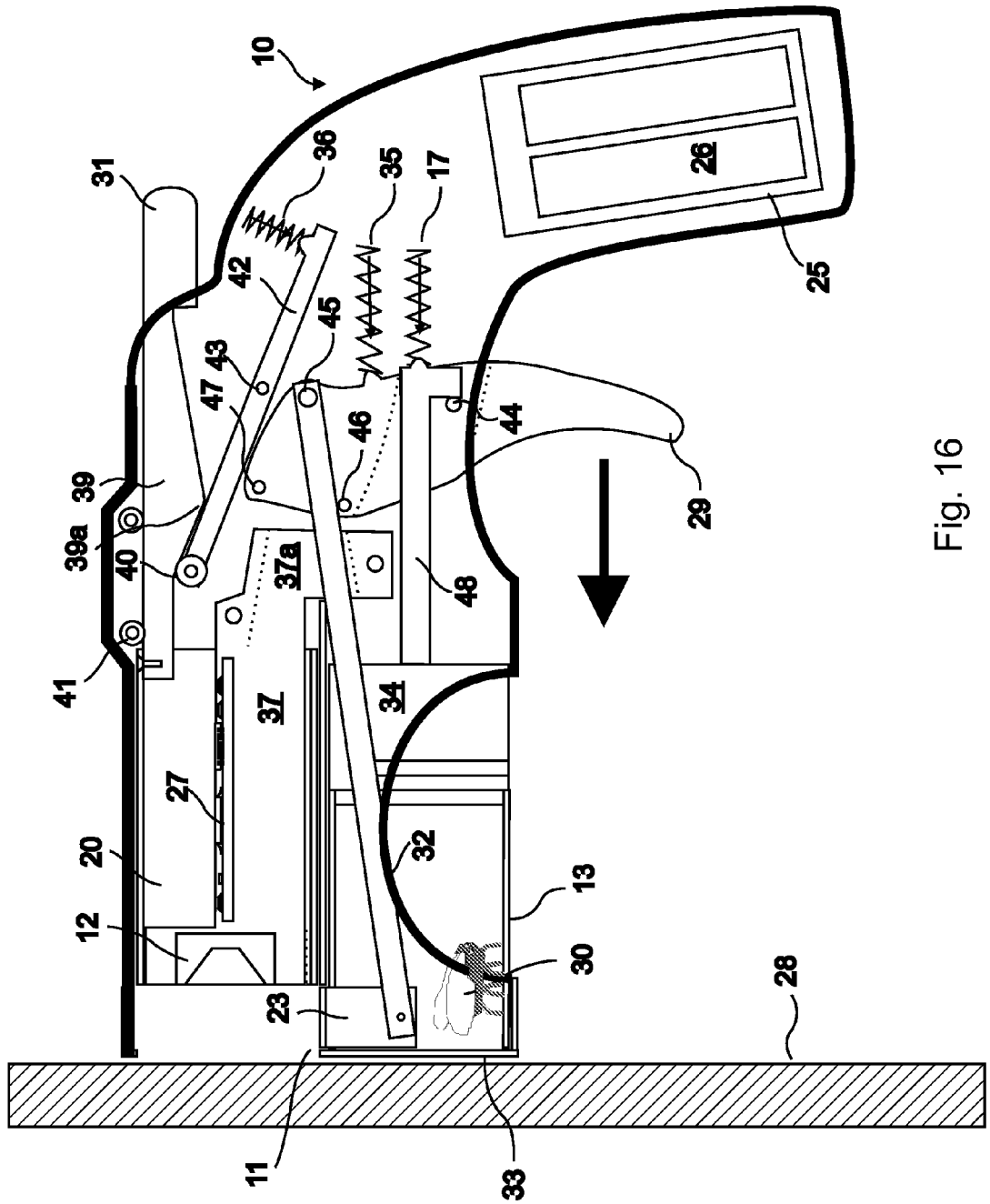
Figure 17:
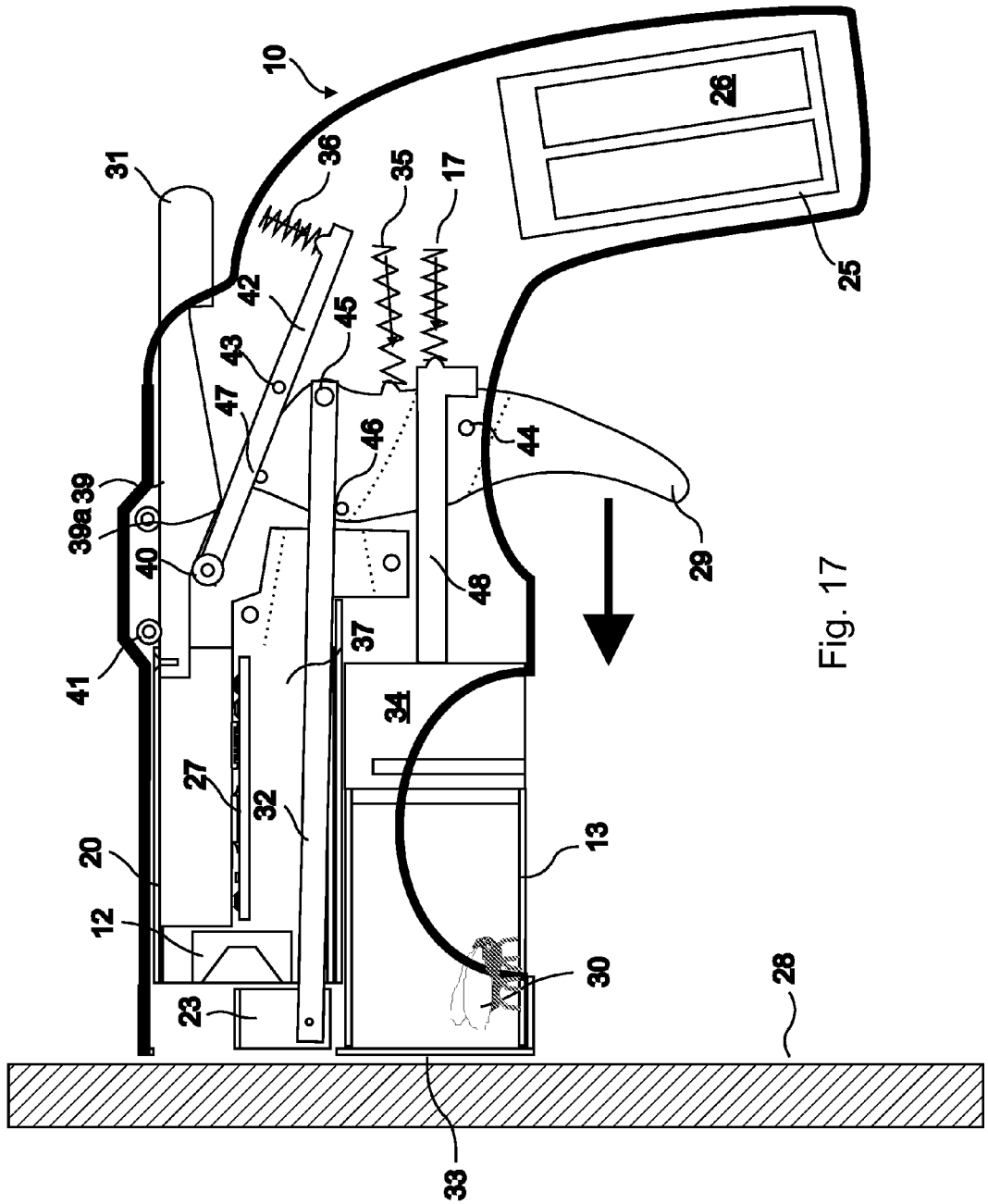
Figure 18:
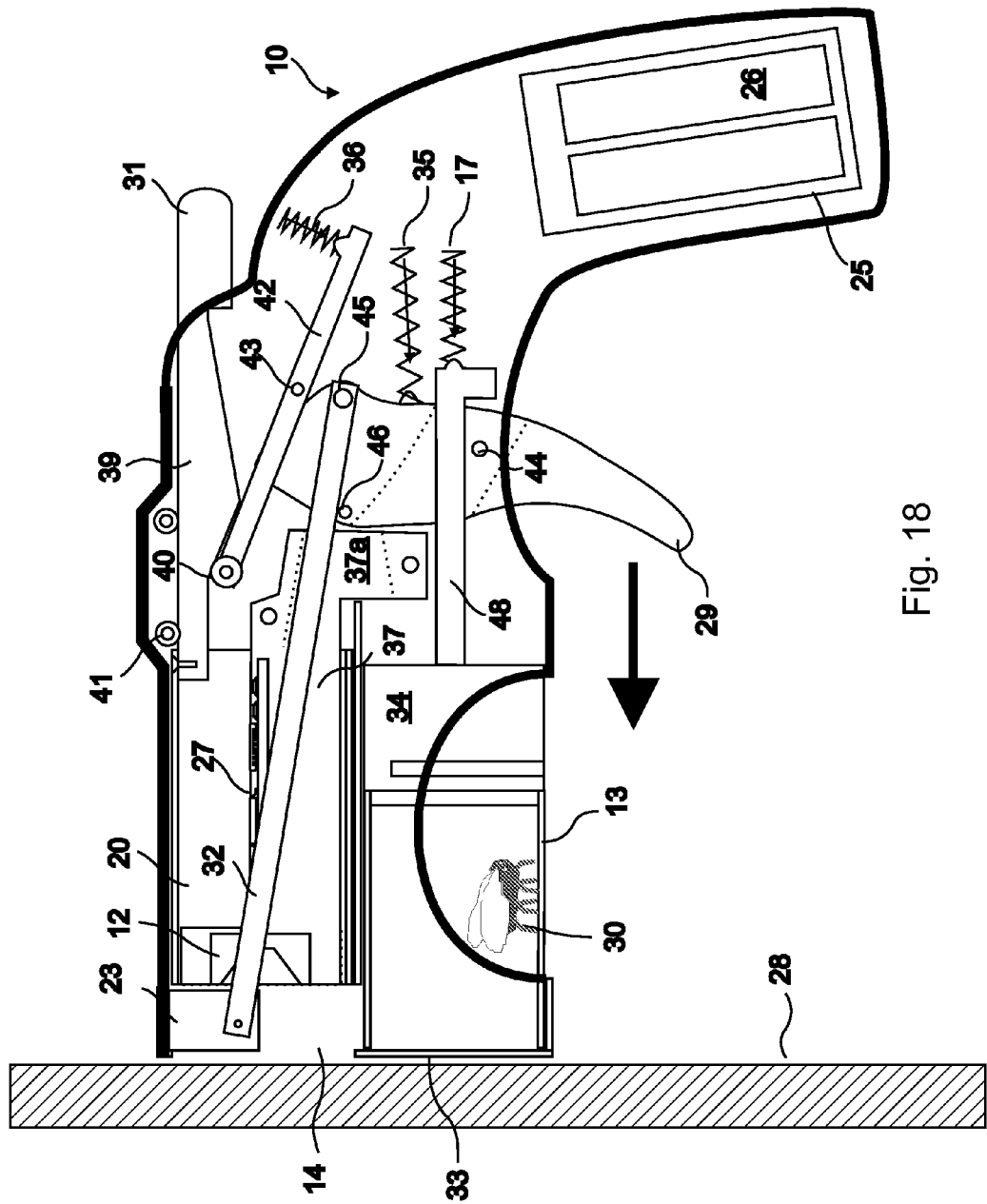
Figure 19:
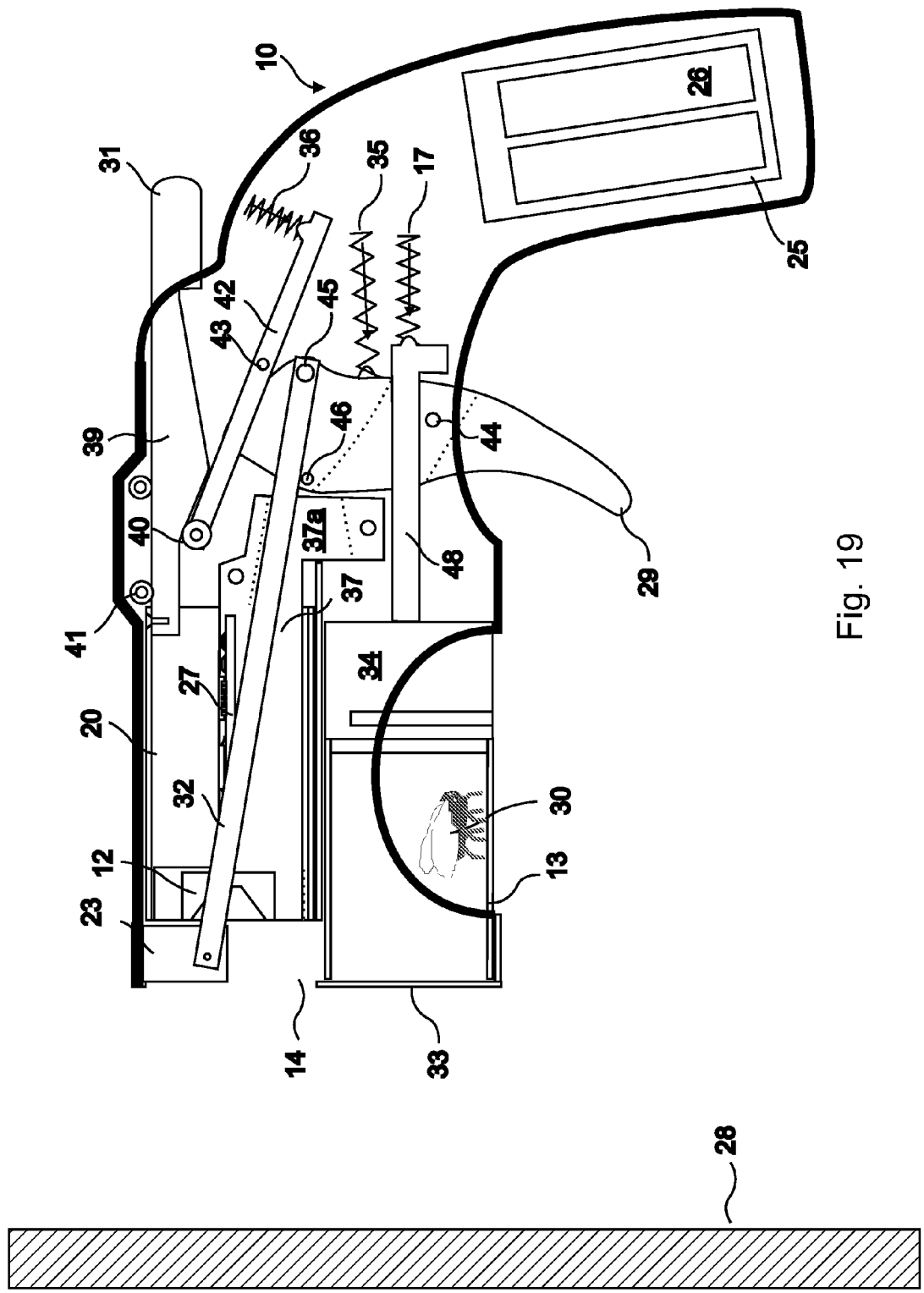
Figure 20:
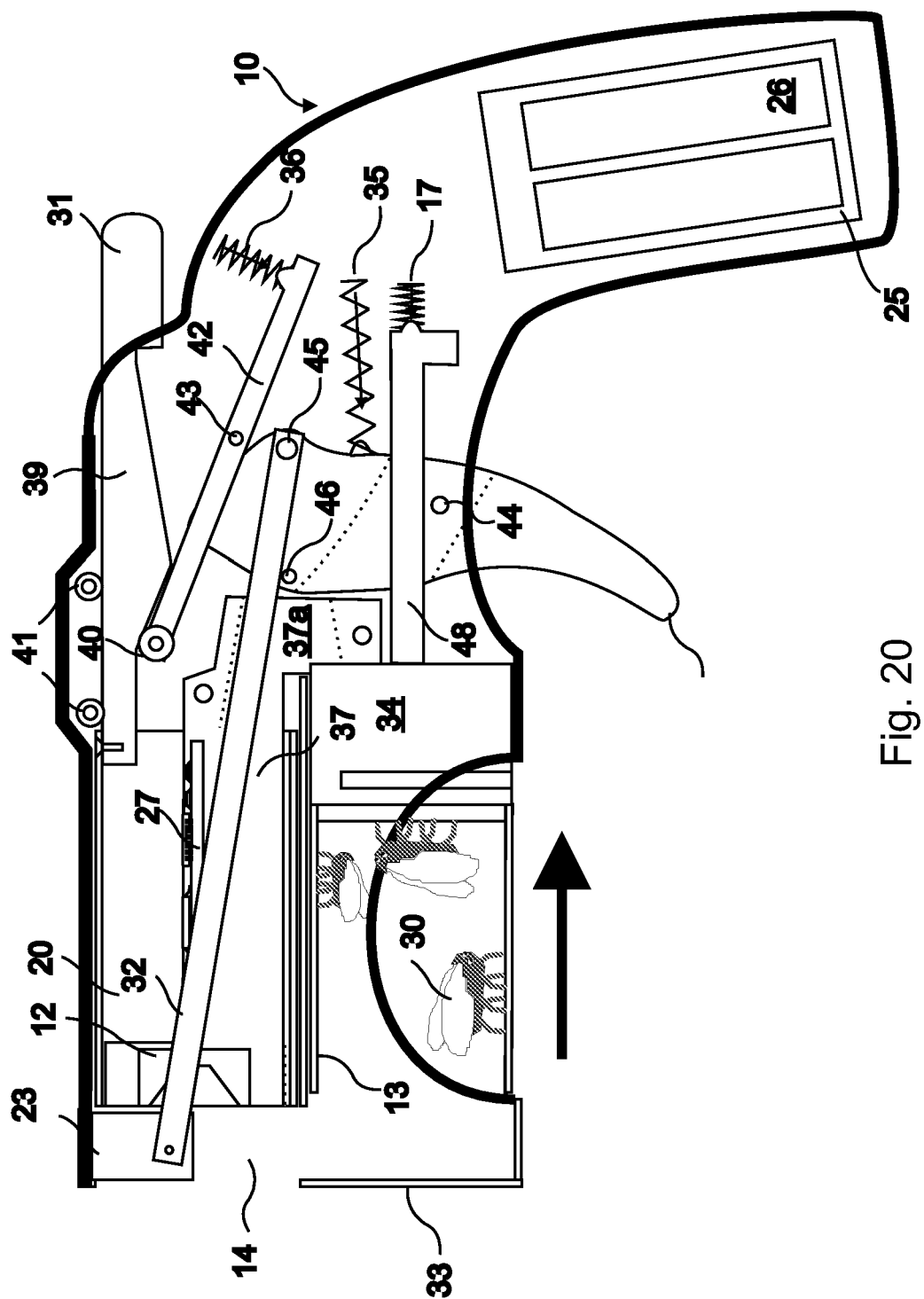
Figure 21:
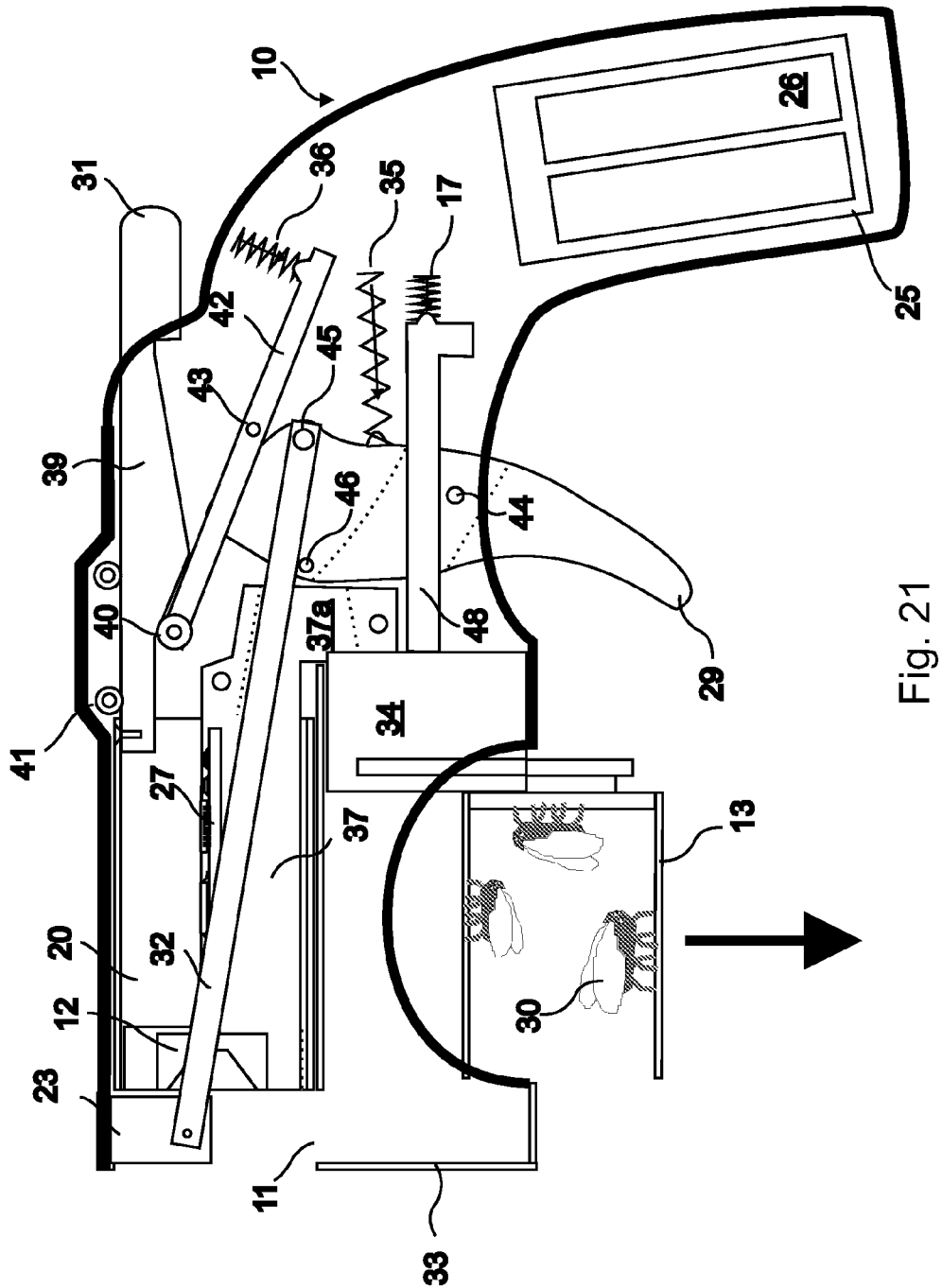
Figure 22:
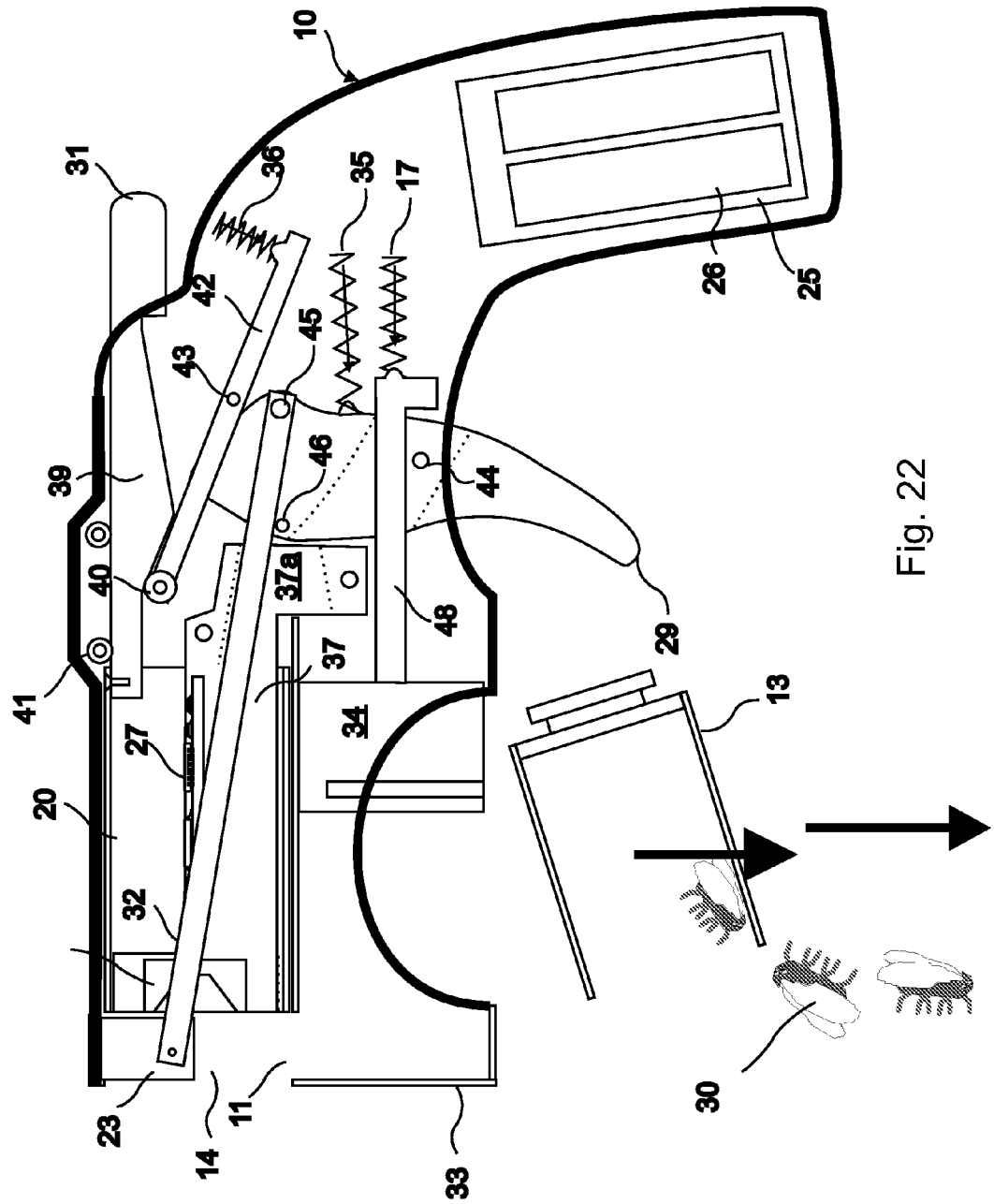

FIGS. 4-6 are views according to FIGS. 1 to 3, wherein the trigger is completely pulled, FIG. 7 is a side sectional view of the apparatus in a rest position or initial state is prior to collecting an insect, FIG. 8 is an illustration according to FIG. 7, wherein the catch tube knob is pushed, FIG. 9 is an illustration according to FIG. 8, wherein the light source is switched on and activated for catching the insect, FIG. 10 is an illustration, wherein the insect is fixed in the catch tube imposed on the insect, FIG. 11 shows an illustration according to FIG. 10, wherein the catch tube is pressed back, FIG. 12 is an illustration according to FIG. 11, wherein the catch tube snaps backwards, FIG. 13 shows an illustration according to FIG. 12, wherein the trigger is pulled halfway, FIG. 14 shows an illustration according to FIG. 13, wherein the trigger is pulled two thirds and the slider is moving the insect, FIG. 15 is an illustration according to FIG. 14, wherein the trigger is completely pulled and the insect is moved into the catch container, FIG. 16 shows an illustration according to FIG. 15, wherein the trigger is released halfway and the catch container is closed, FIG. 17 shows an illustration according to FIG. 16, wherein the trigger is released two thirds, FIG. 18 shows the apparatus again in its rest position with the insect caught, FIG. 19 is an illustration according to FIG. 18 removing the pistol from the contact surface, FIG. 20 shows the apparatus in the removable position pulling back the catch container, FIG. 21 is an illustration according to FIG. 20, wherein the catch container is pulled downwards, FIG. 22 is an illustration of the apparatus when discharging the insect.

DETAILED DESCRIPTION OF PREFERRED EXEMPLIFIED EMBODIMENTS

The invention is now described in more detail as an example with reference to the enclosed drawings. However, the exemplified embodiments are only examples which are not to restrict the inventive concept to a specific disposition.

The apparatus represented in the Figures is for trapping insects, more especially flying insects, such as common houseflies, mosquitoes and midges, but also wasps, bees and the like. A hand-held device is represented in the exemplified embodiment, however, in principle, the apparatus can also be used in other ways. In the case of a hand-held device, the apparatus can be developed, in principle, in such a manner that it fits in every pocket. Depending on requirement, it can be used particularly in hospitals, clean rooms, in private areas or also in the catering trade where it is used to remove insects that are no longer flying away from customers' foodstuffs and meals.

The apparatus has a casing 10, wherein the light sources 12 is disposed in the casing for dazzling and immobilising an insect 30 on the contact surface 28. The immobilising device is formed by a light source 12 which has the job of dazzling the insects caught in a trap region in front of the apparatus as shown in FIG. 7. The at least one light source 12 can be an electric light bulb or, equally as good, an LED, wherein more especially a, for example, sinusoidal or square-wave pulsing of the light source has been proven to be advantageous. Once the trap area has been slipped over the insect, the intensity of the light source is preferably dimmed from 0 to 100%, a period lasting approximately two seconds being proven to be suitable for this purpose. The preferably temporary dazzle effect also occurs at constant light, but is worse. Other means can also be used as the immobilising device as long as it is ensured that they are harmless to people and to higher-evolved animals, on the other hand, however, it should also be ensured that they preferably only accomplish a partial immobilising or respectively dazzling of the insects.

The light source 12 preferably shines out of the apparatus with a narrow beam. Consequently, an insect can be sighted, for example, at 1 m away. Although the user then approaches the insect, the insect stops until the catch tube 20 has been slipped over it. As the trap area is preferably transparent at least in the front region, the insect does not perceive it initially with its compound eye on account of the dazzle. Once the trap tube 20 has been slipped over the insect, the said trap area can be obscured in order to move the insect, or respectively to have the insect moved, in the direction of a catch container 13 for collection and retention of the insects 30.

The light source 12, which is disposed in the vicinity of the gap 11, is operated at a wavelength that is at least visible to the insect eye. A modulation of between 5 and 20 Hertz, preferably 10 Hertz, has proven to be advantageous. At this modulation, the insect begins to sway and to shake and this makes it easier for the catch tube to be slipped over. It is preferable for only one light source to be used, however several can be provided.

The catch tube 20 is disposed in the casing 10 and movable relative to the casing. The catch container 13 is disposed adjacent to the catch tube 20 and a slider 23 lifts the insect 30 off the contact surface 28, wherein the slider is movable relative to the casing 10. Also the catch container 13 is movable relative to the casing. The slider 23 comes into contact with the insect 30 for lifting the insect off the contact surface. As will be explained in more detail with respect to FIGS. 7 to 22 the catch tube is slidable between a rest position in which the catch tube is disposed within the casing 10 and a protruded position in which a portion of the catch tube 20 jumps out of the casing 10. The light source 12 switches on when the trigger 29 is pulled. The catch tube 20 has an open end and the light source 12 is disposed relative to the catch tube such that light from the light source 12 passes through the open end of the catch tube 20. A catch tube knob 31 is connected to the catch tube 20 for pushing the catch tube from the rest position to the protruded position. The catch tube 20 comes into contact with the contact surface 28 to hold the insect 30 within a space 14 defined by the catch tube 20 and the contact surface 28. The catch tube 20 is moved from the protruded position towards a rearward direction by pushing the catch tube 20 against the contact surface 28. The catch tube 20 returns to the rest position by pulling the catch tube knob 31. This pulling is effected by pulling the trigger 29 of the apparatus. The catch tube 20 and the catch container 13 are movable in a first direction relative to the casing 10 and the slider 23 is movable in a second direction perpendicular to the first direction. A slider arm 32 is connected to the slider 23. The trigger 29 is connected to the slider arm 32. The slider 23 moves relative to the casing 10 according to the movement of the trigger 29 and the slider arm 32.

When the catch container 13 is in a closed position, the open end of the catch container 13 is covered and closed by a front surface 33 of the casing 10. The catch container 13 is slidable from the closed position to an open position in which the open end of the catch container 13 is spaced apart from the front surface 33 of the casing 10 by a gap 11.

The catch tube 20 is disposed in a first region of the casing 10, while the catch container 13 is disposed in a second region of the casing 10 adjacent to the first region. The slider 23 moves in a first direction from the first region to the second region as the catch container 13 slides from the closed position to the open position. The slider 23 moves in a second direction from the second region to the first region as the catch container 13 slides from the open position to the closed position. The slider 23 passes through the gap 11 between the catch container 13 and the front surface 33 of the casing 10 when the slider 23 moves from the first region to the second region or from the second region to the first region. A catch container holder 34 is provided for holding the catch container 13. The catch container 13 is detachable from the casing as can be seen in the FIGS. 20 to 22. The catch container holder 34 is connected to the catch container 13 and the first resilient means 17 is connected to the catch container holder 34 to move it to its closed position. Thus, the catch container 13 is slidable from the closed position to the open position as the first resilient element 17 is compressed.

The trigger 29 is connected to the slider 23 via the slider arm 32 and the second resilient element 35 is connected to the trigger 29. When the trigger 29 is pulled, the second resilient element 35 is compressed to move the slider 23 in the first direction from the first region to the second region and the first resilient 17 is compressed to is slide the catch container 13 from the closed position to the open position. When the trigger 29 is released, the first resilient element 17 is released to slide a catch container 13 from the open position to the closed position and the second resilient element is released to move the slider 23 in a second direction from the second region to the first region.

The functioning of the apparatus will now be explained with reference to FIGS. 7 to 22.

FIG. 7 shows the apparatus in its rest position and an insect 30 on a contact surface 28. The apparatus comprises a battery department 25 and batteries 26. The energy is essentially used for the electronics 27 for operating the light source 12, preferably an LED with a certain frequency. Starting from this rest position the catch tube knob 31 at the upper right of the apparatus in FIG. 7 is pressed, thereby moving catch tube 20 forwards as illustrated in FIG. 8. This corresponds to an arming of the apparatus. In pushing the catch tube knob 31 into the apparatus, functioning element 39 in FIG. 8 is moved to the left. This functioning element can be one piece with the catch tube knob 31. The functioning element is fixed to the catch tube 20. In pushing catch tube knob 31 into the apparatus, functioning element 39 moves along rollers 41. At the same time roller 40 rolls along an inclined surface of functioning element 39. Roller 40 is mounted to the end of release bar 42 which is supported by a third resilient means 36 at the casing 10. As soon as tip 39a of functioning element 39 is reached by roller 40, resilient element 36 is released and forces roller 40 to roll down the second inclined surface until the end position shown in FIG. 9. At the same time release bar 42 is swivelled around axis 43. This rolling of roller 40 along the second inclined surface on functioning element 39 leads to a jumping out of the catch tube 20 as shown in FIG. 9. At the same time light source 12 is switched on and the apparatus is activated for catching.

Light source 12 is now immobilising the insect, so that the apparatus can be brought into a position according to FIG. 10, wherein the catch tube 20 touches the contact surface 28, so that the catch tube 20 is imposed on insect 30.

In comparing FIGS. 10 and 11 the apparatus is now completely approached to the contact surface 28, such that catch tube 20 is pressed back into the casing 10. This leads to the effect, that roller 40 is moved along the second inclined surface of functioning element 39 back to the tip 39a. At the same time catch tube knob 31 is brought back into a position, wherein it is outside of the casing 10. This motion is effected just by pressing the apparatus against the contact surface 28 as it is illustrated by the arrows in FIG. 11. As soon as tip 39a of functioning element 39 is reached by roller 40, it rolls down the inclined front surface of functioning element 39, so that the catch tube 20 snaps backwards as is indicated by the arrow in FIG. 12. This motion is supported by the third resilient means 36, now being in its uncompressed position again.

In the next step trigger 29 is pulled according to FIG. 13. FIG. 13 shows the trigger pulled halfway. In pulling the trigger the trigger is moved around axis 45 mounted on casing 10. The slider arm 32 is connected to trigger 29 at axis 45. Additionally trigger 29 comprises two bolts 46, 47. On comparing FIGS. 12 and 13 it can be seen, that slider arm 32 lies adjacent to bolt 46 in FIG. 12, while it lies in between bolts 46 and 47 in FIG. 13. In moving the trigger to the position in FIG. 14, wherein trigger 29 is pulled two thirds, bolt 47 comes into contact with the upper side of slider arm 32, and in pulling the trigger furthermore bolt 47 moves slider 23 via slider arm 32 in FIG. 14 downwards. At the same time, bolt 44 comes in contact with contact bar 48, which at the other end is in contact with the catch container 13. In pulling trigger 29, the first resilient means 17 is compressed because of the backwards movement of contact bar 48. At the same time catch container 13 is moved backwards relative to casing 10, so that the gap 11 is opened between catch container 13 and front surface 33 of casing 10.

FIG. 15 shows trigger 29 completely pulled, so that bolt 47 is urging slider arm 32 and thus slider 23 to its most downward position. As can be seen slider arm 32 is at the lowest position within opening 37a of holder 37 adapted to hold electronics 27 and light source 12 within casing 10. In this position slider 23 is closing the gap 11, is so that insect 30 escapes into catch container 13. When the trigger 29 is completely pulled, also catch container 13 is in its rightmost position, as connecting bar 48 together with catch container 13 is pulled backwards, i.e. in FIG. 15 to the left, by bolt 44 against the force of first resilient means 17. Additionally, trigger 29 compresses a second resilient means 35.

In releasing trigger 29 according to FIG. 16 catch container 13 is moved to the left thereby closing gap 11, while slider 23 still remains in the position according to FIG. 15, until bolt 46 lifts slider arm 32 in FIG. 16 upwards. This upward movement continues when the trigger is further released according to FIGS. 17 and 18 assisted by the force of first and second resilient elements 17, 35. FIG. 18 constitutes the rest position with the insect 30 caught. The apparatus can now be removed from contact surface 28 according to FIG. 19.

In order to discharge catch container 13 it is pulled back, i.e. in FIG. 20 to the right against the force of resilient element 17. Catch container 13 can then be released from front surface 33 and casing 10 according to FIG. 21, so that the insects can be set free as illustrated in FIG. 22.

The invention claimed is:

1. An apparatus for catching an insect sitting on a contact surface, the apparatus comprising:
   a casing;
   a light source disposed in the casing for dazzling and immobilizing the insect on the contact surface;
   a catch tube disposed in the casing and movable along and relative to the casing;
   a catch container disposed adjacent to the catch tube and comprising an open end; and
   a slider to lift the insect off the contact surface, the slider being movable along the contact surface and relative to the casing,
   wherein:
   when the catch container is in a closed position, the open end of the catch container is covered and closed by the casing;
   the catch container is slidable from the closed position to an open position in which the open end of the catch container is spaced apart from the casing;
   the apparatus further comprises a catch container holder connected to the catch container and a first resilient element connected to the catch container holder; and the catch container is slidable from the closed position to the open position as the first resilient element is compressed.

2. The apparatus of claim 1, wherein the slider comes in contact with the insect for lifting the insect.

3. The apparatus of claim 1, wherein the catch tube is slidable between a rest position in which the catch tube is disposed within the casing and a protruded position in which a portion of the catch tube jumps out of the casing.

4. The apparatus of claim 3, further comprising a catch tube knob connected to the catch tube for pushing the catch tube from the rest position to the protruded position.

5. The apparatus of claim 4, wherein the catch tube returns to the rest position by pulling the catch tube knob.

6. The apparatus of claim 3, wherein the catch tube moves from the protruded position toward a rearward direction by pushing the catch tube against the contact surface.

7. The apparatus of claim 1, wherein the catch tube has an open end, and the light source is disposed relative to the catch tube such that light from the light source passes through the open end of the catch tube.

8. The apparatus of claim 1, wherein the catch tube comes in contact with the contact surface to hold the insect within a space defined by the catch tube and the contact surface.

9. The apparatus of claim 1, wherein the catch tube and the catch container are movable in a first direction relative to the casing and the slider is movable in a second direction perpendicular to the first direction.

10. The apparatus of claim 1, further comprising a slider arm connected to the slider and a trigger connected to the slider arm,
wherein the slider moves relative to the casing according to movement of the trigger and the slider arm.

11. The apparatus of claim 1, wherein:
the catch tube is disposed in a first region of the casing;
the catch container is disposed in a second region of the casing adjacent to the first region; and
the slider moves in a first direction from the first region to the second region as the catch container slides from the closed position to the open position.

12. The apparatus of claim 11, wherein the slider moves in a second direction from the second region to the first region as the catch container slides from the open position to the closed position.

13. The apparatus of claim 12, wherein the slider passes through a gap between the catch container and a front surface of the casing when the slider moves from the first region to the second region or from the second region to the first region.

14. The apparatus of claim 12, further comprising a trigger connected to the slider via a slider arm and a second resilient element connected to the trigger,
wherein, when the trigger is pulled, the second resilient element is compressed to move the slider in the first direction from the first region to the second region and the first resilient element is compressed to slide the catch container from the closed position to the open position, and
wherein, when the trigger is released, the first resilient element is released to slide the catch container from the open position to the closed position and the second resilient element is released to move the slider in a second direction from the second region to the first region.

15. The apparatus of claim 1, wherein the catch container is detachable from the casing.

\* \* \* \* \*